(No Model.) 5 Sheets—Sheet 3.
J. Q. A. NEWSOM.
STEAM PLOWING, PULVERIZING, AND CULTIVATING MACHINE.
No. 349,807. Patented Sept. 28, 1886.
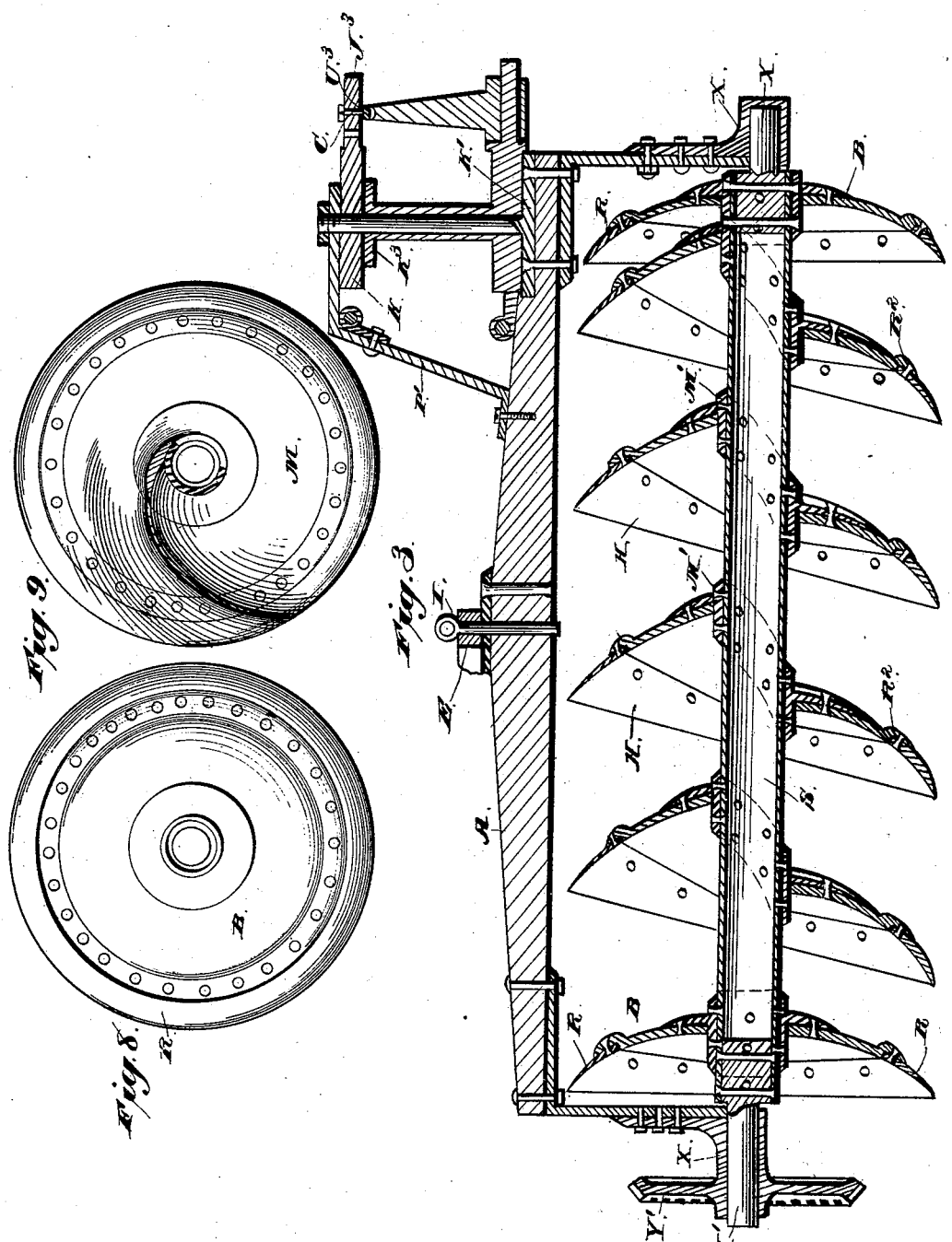
Witnesses:
Charles S. Hyer
L. W. Seely
Inventor:
John Q. A. Newsom.
By [signature], Atty.

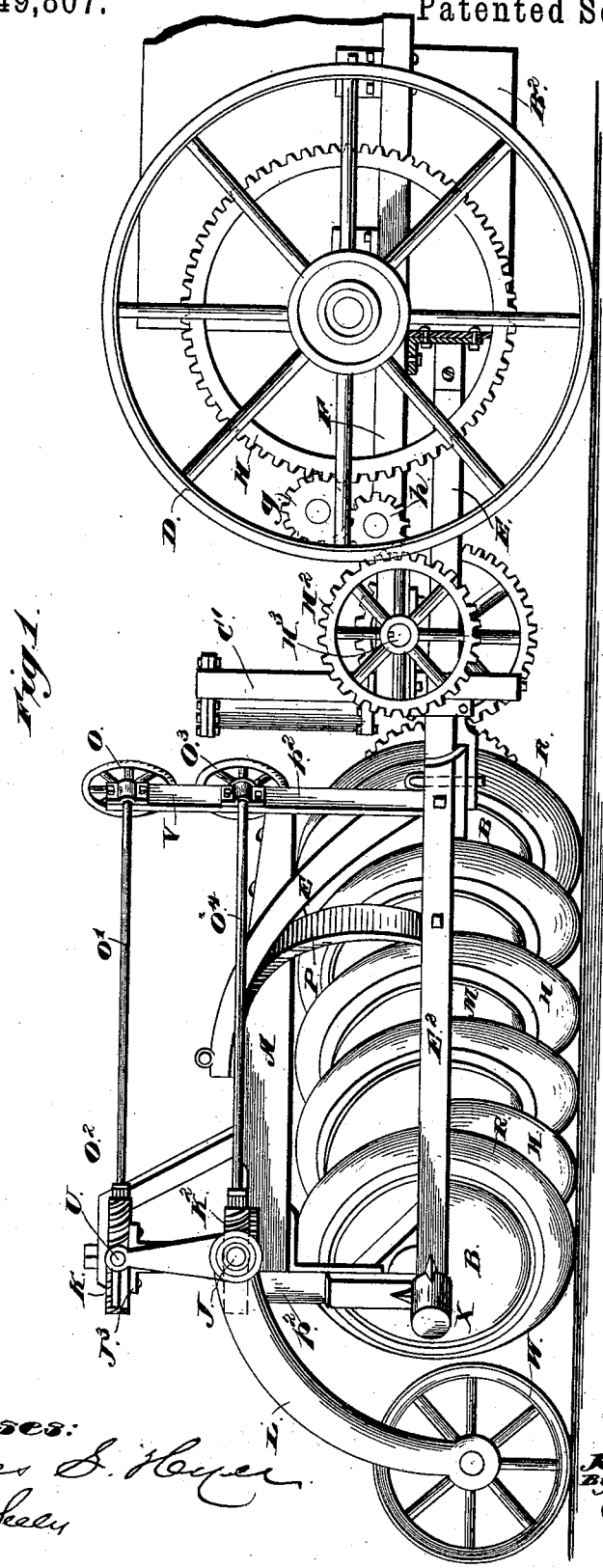

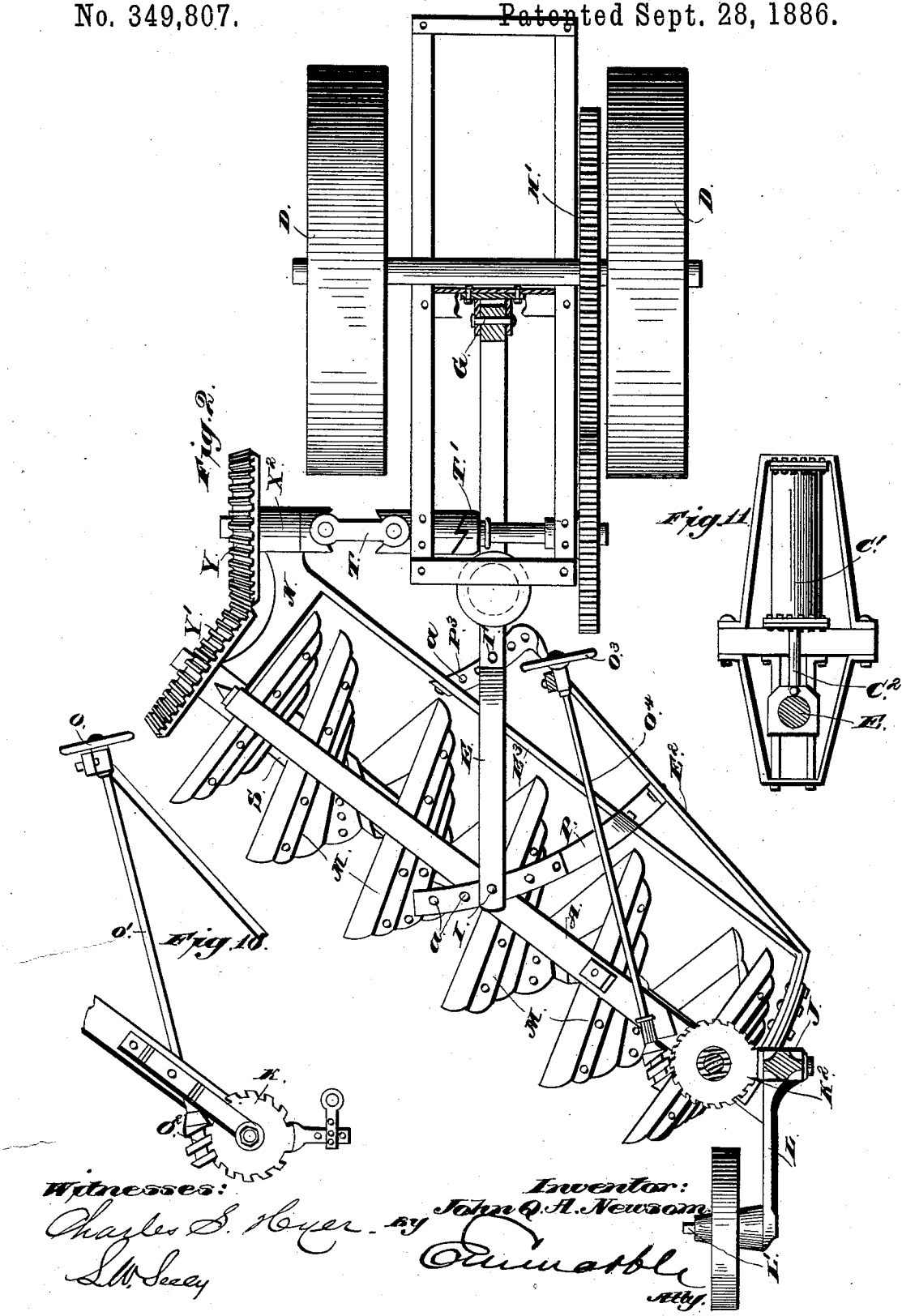

(No Model.) 5 Sheets—Sheet 4.
J. Q. A. NEWSOM.
STEAM PLOWING, PULVERIZING, AND CULTIVATING MACHINE.
No. 349,807. Patented Sept. 28, 1886.
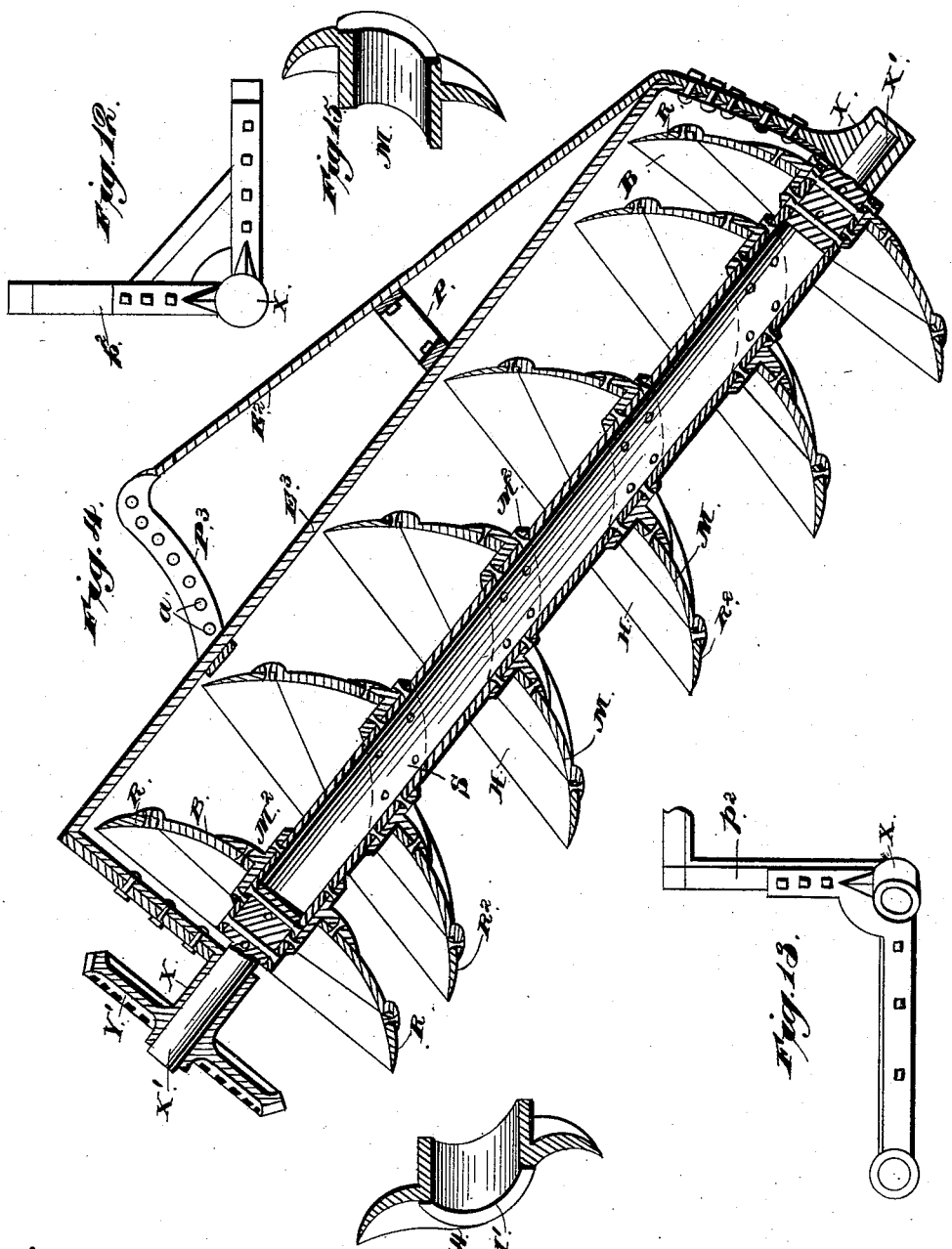
Witnesses:
Charles S. Hyer
L. W. Seely
Inventor:
John Q. A. Newsom
By Munn & Co.
Atty.
N. PETERS. Photo-Lithographer, Washington, D. C.

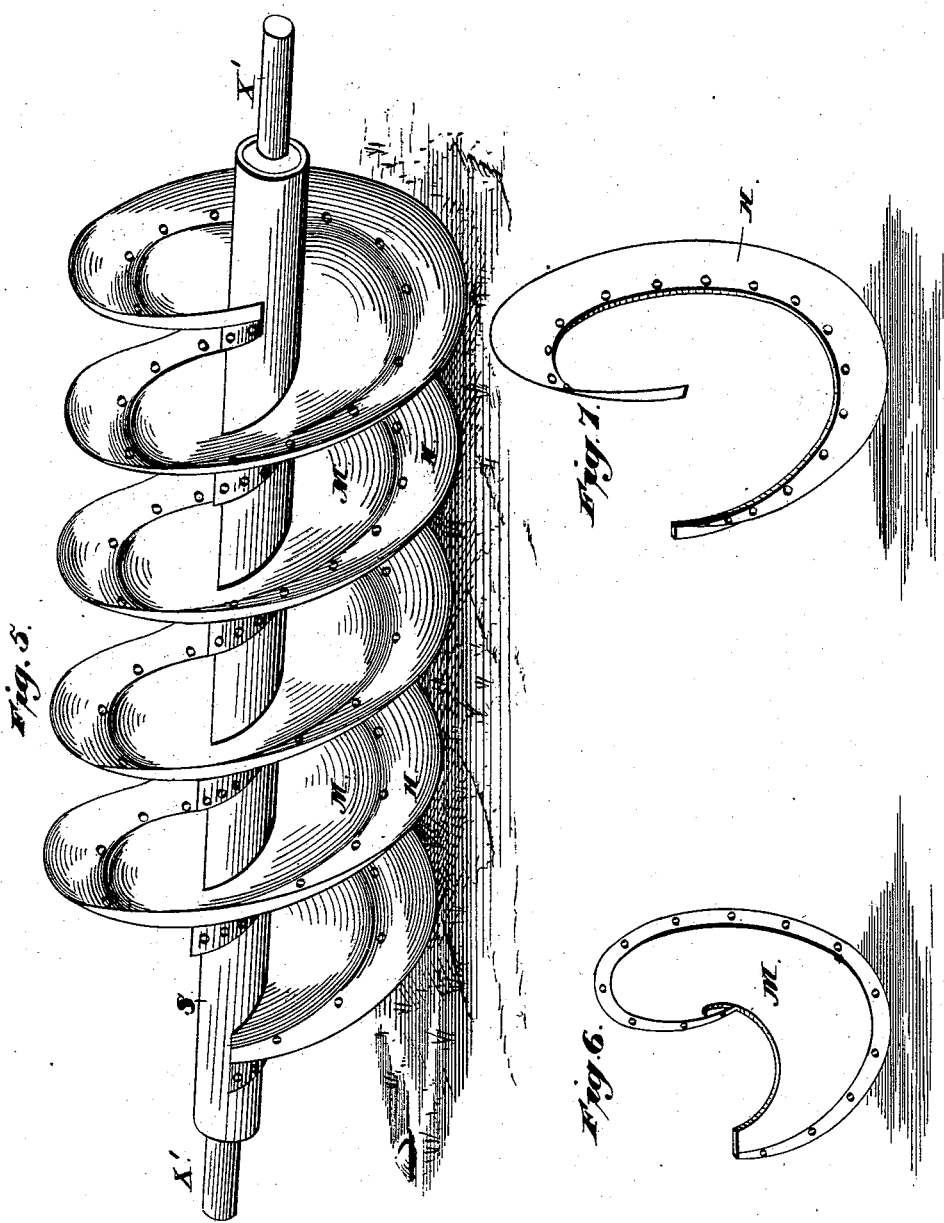

UNITED STATES PATENT OFFICE.

JOHN Q. A. NEWSOM, OF SEYMOUR, INDIANA.

STEAM PLOWING, PULVERIZING, AND CULTIVATING MACHINE.

SPECIFICATION forming part of Letters Patent No. 349,807, dated September 28, 1886.

Application filed March 30, 1885. Serial No. 160,726. (No model.)

*To all whom it may concern:*

Be it known that I, JOHN Q. A. NEWSOM, a citizen of the United States, residing at Seymour, in the county of Jackson and State of Indiana, have invented a new and useful Plowing, Pulverizing, and Cultivating Machine, of which the following is a specification, which will enable others skilled in the art to which it relates to make and use the same.

My invention relates to improvements in rotary spiral plows, and more particularly to that class of plows in which a series of cutting-blades is arranged spirally upon a driven shaft, which disks enter the ground at an angle to the line of draft, forming a number of furrows parallel to each other as the plow is moved.

The object of my invention is to provide a plow adapted to be drawn or driven by steam or horse power, or connected to a traction-engine, in which the main shaft carrying the spiral blades is placed diagonally to the line of draft, and having means for changing the angle of the frame and shaft to the line of draft, so as to change the angle at which the blades enter the soil at will, and consequently the width of the strips cut by such blades and the width of the strip cut by the whole plow.

The invention consists, partly, in the peculiar manner of connecting the frame which supports the plow to the draft-bar, so as to permit of the horizontal adjustment of the frame to the line of draft; further, in the peculiar construction of the rotary blades, their detachable shares, and in the connection of the disks to the main shaft; further, in providing a plow having a geared revolving shaft and cutters, to which power is transmitted, with a connection to the power which permits the plow-frame to be adjusted to the line of draft without affecting the operation of the gearing or shaft; further, in providing a plow of the class mentioned with an adjustable furrow-wheel capable of vertical and horizontal movement, by means of which the proportion of the weight of the plow thrown upon the cutters may be increased or diminished, or by which the whole weight of the plow may be brought upon the furrow-wheel, rendering the cutters inoperative, and enabling the operator to use the furrow-wheel to some extent in guiding the movement of the machine. It consists, also, in the peculiar construction of the devices for operating and controlling the furrow-wheel; further, in the construction of the plow-frame; and, finally, in various details of construction fully hereinafter described.

In the accompanying drawings, Figure 1 is a side elevation of the entire plow in connection with a traction-engine. Fig. 2 is a plan view of the entire plow, showing its connection with a traction-engine. Fig. 3 is a vertical cross-section through the main shaft, showing the suspending-frame. Fig. 4 is a horizontal sectional view taken on a line through the boxes for the main shaft. Fig. 5 is a perspective view of the main shaft and the spiral blades, the end disks being removed. Fig. 6 is a front elevation of one of the concavo-convex spiral blades. Fig. 7 is a separate view of a section of the spiral detachable share. Fig. 8 is a side elevation of one of the end cutting-disks. Fig. 9 is a side elevation of one of the spiral blades. Fig. 10 is a plan view of mechanism for adjusting the guide or furrow wheel. Fig. 11 shows the construction of the frame for supporting the steam-cylinder. Fig. 12 is a rear elevation of a part of the plow-frame. Fig. 13 is a front elevation of a part of the plow-frame. Figs. 14 and 15 are views of brackets for securing the disks to the main shaft.

In the drawings, in which like letters indicate the same parts throughout, the main shaft is represented by S. It is a straight hollow cylindrical shaft, as shown in Fig. 5, and is provided with extended journals X' X', which revolve in boxes X X having horizontal and vertical extensions, Fig. 1. These boxes are suspended from the main frame of the plow, as shown in Figs. 3 and 4, where A represents a transverse beam or bolster to which are bolted angle-bars $p^2 p^2$, the lower ends of which are bolted to the vertical extension of the boxes. To the horizontal extensions of the boxes is bolted a horizontal angular bar, $E^3$, Fig. 2, which forms a portion of the frame and which is substantially parallel to the main shaft S and bolster A. The frame is adjustably connected to the draft-bar E, as shown in Fig. 2.

$p p^3$ are curved segments centered from the universal coupling T, and each provided with a row of registering adjusting-holes, $a$. The outer ends of these segments are secured to a bar, $E^2$, which is bolted to one of the journal-boxes X by the same bolts which secure bar E³ thereto, the segment P being attached to the said bar E² near its middle and the segment P³ at its free end. The other end of segment P³ is connected to the bar E³.

The draft-bar E is connected by a removable bolt, I, to the bolster A, the bolt passing through one of the holes in the segment P and to the segment P³ by a bolt, I'. It will thus be seen that the bolster A, the bars E² and E³, and the two segments constitute a rigid frame-work which carries the main plow-shaft; and, further, that the angle of this frame-work and the suspended shaft to the line of draft can be readily changed by changing the position of the bolts in the segments.

To widen the furrow the plow-frame is swung forward on the universal joint, which will have the effect of decreasing the angle at which the cutters enter the ground, and thus of widening the strips cut by each section, as well as the strip cut by the whole plow. The position of both bolts I and I' would be changed by moving the segments to the right, according to the amount of adjustment required. The converse is true when the bolts are moved to the rear ends of the segments. The range of adjustment in the machine shown in the drawings is about thirty degrees.

The plows are shown particularly in Figs. 5, 6, and 7 and throughout the drawings generally. They are composed of spiral concavo-convex sections M, Fig. 6, and removably mounted on the shaft with their ends abutting to form a series of continuous spiral cutters. The degree of convexity given to the spiral disks may be varied according to the nature of the soil in which the plow is to be used, a greater degree of convexity being desirable in working in dry sandy soil and a less degree in moist or sticky ground. To each section or blade of the spiral cutter is bolted a spiral hardened share, H, Fig. 7. A continuous groove, R², is made in the disks M, around the outer edge thereof, which forms a shoulder against which the inner edge of the share H bears, Fig. 3, and through which the fastening-bolts pass. It will be understood that a series of removable shares is thus formed, each capable of being detached from its supporting-disk for sharpening or replacing with others, as may be desired.

The series of spiral blades may be secured to the shaft in any desired or convenient way; but I prefer to use the means illustrated in Figs. 3, 14, and 15, wherein M' M² represent brackets bolted to the shaft and to the spiral blades. These brackets may be cast or otherwise formed of spiral shape, so as to fit the shaft, and each is provided with a flange extending entirely around, through which the bolts pass which secure it to the blades. The main part of the brackets is of such shape as to conform to the shaft, and may be made in several sections if desired, each bolted to the shaft, and thus forming a continuous bracket.

The brackets to which the end blades, B B, are secured are cylindrical sleeves provided with concave circular flanges, which fit the convex surfaces of the end disks and are bolted thereto, as shown in Fig. 3.

Near the ends of the main shaft, and just inside the journal-boxes, are secured concavo-convex cutting-disks B B, arranged at right angles to the shaft and secured to it by brackets, as shown. Each of these disks is provided with a detachable hardened share or cutting-edge, R, secured to it in the same manner as the detachable shares H to the spiral blades.

When power is applied to the plow the shaft revolves in its bearings, while the plow moves forward in the line of draft diagonally to the axis of rotation of the main shaft, as shown in Fig. 1. This movement and the weight of the machine causes the steel shares H and R of the cutting-disks to enter the soil so as to cut downward under the sliced furrow, transporting the soil up and over in a spiral circuit, where it falls or is thrown from the concave surfaces of the blades and into the furrow made by each preceding blade, leaving it completely turned over and thrown up into parallel furrows, the effect being to thoroughly pulverize and loosen up the soil, permitting a thorough permeation by the atmosphere, and thus preventing a too sudden drying and baking.

While horse or stationary-engine power may be used in working my plow, I prefer to connect the coupling-beam or draft-bar E to a traction-engine, as shown in Figs. 1 and 2.

F represents the rectangular frame of the engine, D D the traction-wheels, and H' a large spur-wheel in the axle of the traction-wheels. The main plow-shaft is preferably geared up for speed by means of spur-wheels $g$, $h$, and H², the latter being keyed on a shaft, H³, in the engine-frame, which also carries a clutch, T', by means of which the plow may be disconnected from the driving power. The shaft H³ is connected by a double universal joint, T, with an independent shaft journaled in a box, X², on the casting N, and carrying a bevel gear-wheel, Y. This wheel Y gears into the bevel-wheel Y' on the main plow-shaft, and the angular adjustment of the plow-frame is thus permitted by the hinge motion allowed at the joint T. The relative speed of the wheels D and the shaft H³ may be of course regulated by the size of the gear-wheels $g$, $h$, and H².

The draft-bar E is connected to the frame of the traction-engine by a transverse bolt, G.

B² represents the fire-box of the engine.

W represents a furrow-wheel mounted on a stub-axle, L', projecting from the inner face of a lever, L. Such lever is mounted on a journal, J, projecting from a disk, K², Fig. 3. The disk K² is formed with a sleeve, which is mounted on a long vertical pin having a base flange, K', which is recessed into the top of bolster A and secured by bolts countersunk to permit the disk K² to revolve freely. The upper end of the sleeve on disk K² is provided with a flange, K³, which supports a revolving disk, K, having an extended clevis, U³, recessed to the arm J³, in which the end of the lever L works by ball-and-socket joint U. Holes are formed in the arm J³ and clevis U³, so that the relative position of the lever and disk K may be adjusted by a pin, C. All these parts are braced and supported by a brace, P', bolted to the bolster A, through which passes the pin which forms a part of the disk K'. The parts K² and K³ can thus revolve freely about the pin. These disks, the movement of which controls the furrow-wheel, are operated by a pair of hand-wheels, O and O³, secured to shafts O' and O⁴, which are journaled in a standard, V, Fig. 1. On the opposite end of the shaft O' is secured or formed a worm, O², which meshes with spiral teeth formed on the periphery of the disk K. By turning the hand-wheel O and disk K the lever L turns on pivot J, which lifts or depresses the furrow-wheel according to the direction in which the hand-wheel is turned. If the furrow-wheel is lifted, the weight is brought on the cutting-disks, forcing them into the ground. If the wheel is depressed, the plow is lifted from the ground and the weight supported on the wheel. When in this position the hand-wheel O³, similarly connected to the shaft O⁴ and worm, may be turned, revolving disk K², which will give a horizontal movement to the lever L and furrow-wheel. By operating the hand-wheels O O³ the furrow-wheel may be made to assume any position desired, thereby tending to guide the plow while traveling, and enabling it to be turned in any direction with facility. By means of the horizontal pressure of this furrow-wheel the tendency of the side draft may be counteracted to a very large extent.

Fig. 11 illustrates a method I have devised of putting additional weight upon the plow when working in hard ground where the actual weight is not sufficient to cause the requisite penetration of the cutters. This consists of a steam-cylinder, C', or ram, mounted upon the engine-frame and having steam-connection with the boiler, in which works a plunger, the piston-rod C² being connected to the draft-bar E. The cylinder is properly braced and supported on the frame, and the draft-bar is preferably made round at the point where it is connected to the piston-rod to allow it to turn a little to accommodate itself to inequalities of the ground. Any required amount of steam-pressure may be introduced above the plunger, forcing it down and adding so much additional weight to the plow. It is also evident that any tendency of the guide-wheels of the engine to lift in soft ground or at any time may be counteracted by pressure applied in the manner described to the draft-bar, such bar being connected to the forward part of the engine-frame. It will of course be understood that the steam-pressure may be used in the cylinder to raise the draft-beam, and thus lift the cutters from the ground. This would be done in transporting, turning, and backing, when the steam pressure would operate in connection with the furrow-wheel.

It will of course be evident that many modifications and variations of my invention could be employed without in any way departing from the principle and spirit of my invention.

Having thus described my invention, what I claim as new, and desire to secure by Letters Patent, is—

1. In a rotary plow, the combination, with the main frame, of a main shaft journaled therein obliquely to the line of draft and a series of continuous spiral cutters or blades secured to said shaft, substantially as described.

2. In a rotary plow, the combination, with the main frame, of a main shaft journaled in said frame obliquely to the line of draft, a series of spiral cutters or blades secured to said shaft, and means for changing the angle of the shaft relatively to the line of draft, substantially as described.

3. In a rotary plow, the combination of the bolster A, flanged boxes X X, the bars E² E³, the segments P P³, the draft-bar E, and the main shaft S, substantially as described.

4. The combination, with the main frame, of the casting N, having boxes X X², the shafts S H⁴, the gear-wheels Y Y', and the universally-jointed coupling T, substantially as and for the purposes set forth.

5. In a plow, a lever, as L, having a universal connection with the plow-frame, so as to have a vertical movement and a horizontal movement relatively to the line of draft and carrying a trailing furrow-wheel, substantially as described.

6. In a plow, a pivoted lever carrying a trailing furrow-wheel, in combination with a pair of disks, to which such lever is connected, and means for turning such disks in order to give a horizontal and vertical movement to the lever and furrow-wheel, substantially as described.

7. In a plow, the combination of the lever L, carrying a furrow-wheel, the rotary disk K², upon which said lever is pivoted, the rotary disk K, a universal joint between the said disk and the lever L, and shafts and hand-wheels for operating the said disks, substantially as described.

8. The combination of the lever L, carrying the furrow-wheel W, the disk K, having the clevis U³, the ball-and-socket connection U, and the shaft O', and hand-wheel O, substantially as described.

9. In a steam-plow having a single plow-beam from which the plow-shaft and plows are supported, the combination of such plow-beam with a single steam-cylinder adapted to apply pressure directly to the plow-beam, and thus depress the said beam and the entire series of plows supported thereby, substantially as described.

JOHN Q. A. NEWSOM.

Witnesses:
SAMUEL V. HARDING,
JOSEPH N. NEWSOM.